United States Patent
Wright et al.

(10) Patent No.: US 9,200,966 B2
(45) Date of Patent: Dec. 1, 2015

(54) DUAL FIELD OF VIEW TELESCOPE

(71) Applicant: Raytheon Company, Waltham, MA (US)

(72) Inventors: Richard J. Wright, Tucson, AZ (US); Chadwick B. Martin, Tucson, AZ (US); William R. Owens, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 266 days.

(21) Appl. No.: 13/949,376

(22) Filed: Jul. 24, 2013

(65) Prior Publication Data

US 2015/0028212 A1 Jan. 29, 2015

(51) Int. Cl.
*G01J 5/02* (2006.01)
*G01J 5/08* (2006.01)
*G02B 23/02* (2006.01)
G02B 17/00 (2006.01)
G02B 17/06 (2006.01)
H04N 5/225 (2006.01)

(52) U.S. Cl.
CPC . *G01J 5/08* (2013.01); *G02B 23/02* (2013.01); *G02B 17/00* (2013.01); *G02B 17/06* (2013.01); *H04N 5/225* (2013.01)

(58) Field of Classification Search
CPC .................................. G01J 5/08; G02B 23/02
USPC ........................................ 250/340, 332, 349
See application file for complete search history.

(56) References Cited

U.S. PATENT DOCUMENTS

| | | | |
|---|---|---|---|
| 4,964,706 A | 10/1990 | Cook | |
| 5,009,494 A | 4/1991 | Iossi et al. | |
| 5,161,051 A * | 11/1992 | Whitney et al. | ............... 359/351 |
| 5,363,235 A | 11/1994 | Kiunke et al. | |
| 5,751,473 A | 5/1998 | Runciman | |
| 5,831,762 A | 11/1998 | Baker et al. | |
| 6,970,286 B1 | 11/2005 | Kunick | |
| 2003/0218686 A1* | 11/2003 | Lundgren | ..................... 348/344 |
| 2009/0135494 A1 | 5/2009 | Bietry et al. | |
| 2011/0051229 A1 | 3/2011 | Alexay | |
| 2011/0315878 A1* | 12/2011 | Vizgaitis | ....................... 250/332 |

FOREIGN PATENT DOCUMENTS

EP 2498115 A2 9/2012

* cited by examiner

*Primary Examiner* — David Porta
*Assistant Examiner* — Meenakashi Sahu
(74) *Attorney, Agent, or Firm* — Lando & Anastasi, LLP

(57) ABSTRACT

A multiple field-of-view telescope and optical sensor system and imaging methods using the system. In one example, an optical sensor system includes a primary imaging detector having a first field of view, a telescope configured to receive and focus electromagnetic radiation onto the primary imaging detector along a primary optical axis, a secondary detector having a second field of view different from the first field of view, and relay optics configured to direct and focus a portion of the electromagnetic radiation onto the secondary detector. In certain examples, the system further includes a fold mirror positioned to reflect the portion of the electromagnetic radiation to the relay optics.

13 Claims, 9 Drawing Sheets

DUAL FIELD OF VIEW TELESCOPE

BACKGROUND

There are numerous applications for optical imaging systems, including missile defense applications, for example, which require a high sensitivity wide field-of-view telescope for detection and discrimination purposes. However, it is also frequently desirable to additionally provide a narrow field-of-view configuration in order to achieve higher resolution imaging. Conventionally, switching between configurations with different fields of view, for example, between a wide field-of-view (WFOV) and a narrow field-of-view (NFOV) configuration, involves the use of moving parts, such as laterally movable lenses (to provide "zoom") or other movable optical components, such as a field-of-view switch.

SUMMARY OF INVENTION

Aspects and embodiments relate to optical sensor systems, and in particular, to optical systems capable of providing a wide field of view and a narrow field of view that are simultaneously viewable, showing different portions of a viewed scene.

According to one embodiment, an optical sensor system comprises a telescope configured to receive and focus electromagnetic radiation onto an image plane along a primary optical axis, a primary imaging detector located at the image plane and having a first field of view, a secondary detector having a second field of view different from the first field of view, and relay optics configured to direct and focus a portion of the electromagnetic radiation onto the secondary detector.

The optical sensor system may further comprise a fold mirror fixedly tilted with respect to the primary optical axis and configured to reflect the portion of the electromagnetic radiation, wherein the relay optics is configured to receive the portion of the electromagnetic radiation reflected from the fold mirror and to direct and focus the portion of the electromagnetic radiation onto the secondary detector. In one example the fold mirror is positioned proximate an edge of the primary imaging detector. In another example the fold mirror is positioned on the image plane. The first field of view may be a wide field of view and the second field of view may be a narrow field of view. In one example the relay optics are configured to provide a predetermined magnification to the portion of the electromagnetic radiation. In one example the relay optics include a first lens and a second lens. The optical sensor system may further comprise at least one additional secondary detector, and a corresponding at least one additional fold mirror configured to reflect another portion of the electromagnetic radiation towards the at least one additional secondary detector. In another example the primary imaging detector and the secondary detector are infrared detectors. In one example the optical sensor system further comprises a first dewar assembly, the primary imaging detector being located within the first dewar assembly, and a second dewar assembly, the secondary detector being located within the second dewar assembly. In another example the primary imaging detector is an infrared detector configured to operate in a first spectral band, and the secondary detector is a photosensitive detector configured to operate in a second spectral band different from the first spectral band, a polarization sensitive detector, or a spectral dispersion sensor.

According to another embodiment, an imaging method comprises observing a first field of view by receiving electromagnetic radiation at a primary imaging detector along a primary optical axis of an optical sensor system, directing a portion of the electromagnetic radiation off the primary optical axis, and simultaneously observing a second field of view, different than the first field of view, by receiving the portion of the electromagnetic radiation at a secondary detector.

In one example directing the portion of the electromagnetic radiation includes reflecting a portion of the electromagnetic radiation off the primary optical axis with a fixed fold mirror to provide reflected electromagnetic radiation, and receiving the portion of the electromagnetic radiation at the secondary detector includes receiving the reflected electromagnetic radiation at the secondary detector. The imaging method may further comprise reflecting another portion of the electromagnetic radiation off the primary optical axis with at least one additional fold mirror to provide additional reflected electromagnetic radiation, and receiving the additional reflected electromagnetic radiation with at least one additional secondary detector. In one example directing the portion of the electromagnetic radiation includes passing the portion of the electromagnetic radiation through an aperture located at a field stop of the optical sensor system. The imaging method may further comprise magnifying the portion of the electromagnetic radiation prior to receiving the portion of the electromagnetic radiation at the secondary detector. In another example the imaging method further comprises cryogenically cooling at least one of the primary imaging detector and the secondary detector.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1A:
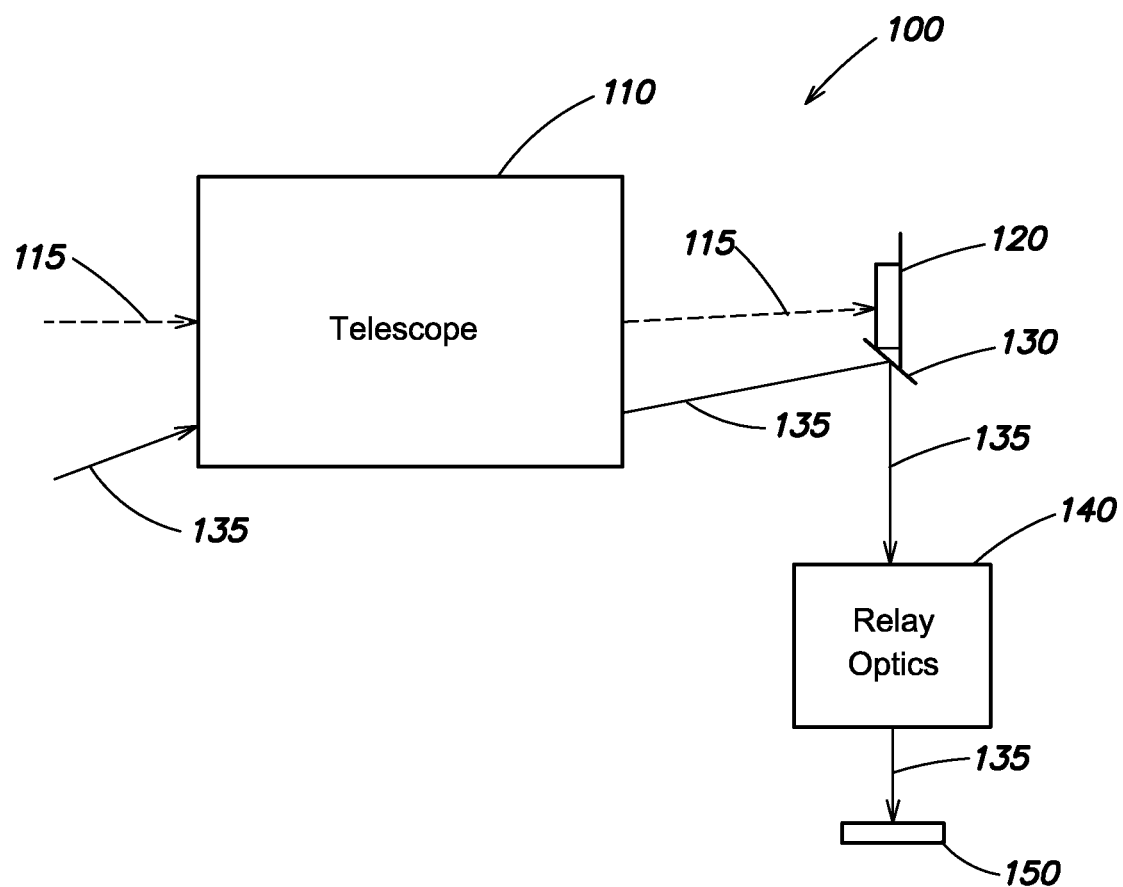
FIG. 1A is a block diagram of one example of an optical imaging system according to aspects of the invention.

There are numerous applications in which it may be desirable to provide both a wide field of view and a narrow field of view, either simultaneously or at different times during operation of the optical system. For example, in missile defense applications, or other target acquisition applications, it may be desirable to provide a wide field-of-view, high sensitivity (i.e., a large amount of optical energy received per pixel of the imaging detector) configuration to allow for viewing of distant objects and target acquisition at long range. Such applications may also benefit from a higher resolution, lower sensitivity image (achieved with a narrow field of view) as the target approaches (for example, during "end game" periods) to allow for fine tuned aiming at the target. As discussed above, conventional optical systems which provide dual fields of view typically require moving optical components. This feature is often undesirable, as it takes time to move the components and change the field of view, during which time the target may not be visible, and because the moving parts may be points of failure, particularly in space-based systems.

Accordingly, aspects and embodiments are directed to a dual field-of-view (FOV) telescope system that does not require moving optical components to switch between different field-of-view configurations. As discussed in more detail below, according to one embodiment, a small "pick off" mirror, or other optical component, is used to divert some of the incident radiation to a supplemental detector and optics section that are not on the main optical path. In one example, this detector is a higher resolution, smaller FOV detector system, which may be queried as necessary, for example, for end game imagery. This detector may also be significantly simpler than the generally large, high sensitivity detector used on the main optical path, for example, having fewer pixels, be uncooled and/or have a lower thermal mass, have a simpler architecture, and/or have reduced noise requirements, thereby reducing the cost associated with the narrow FOV configuration by eliminating the need for a large format infrared focal plane array. The supplemental detector may operate in the same spectral band as the main-path detector, or in a different spectral band. According to one embodiment, alignment between the main-path detector and the supplemental detector is fixed, such that the supplemental detector views a portion of the system's overall field of view, as discussed further below. Thus, aspects and embodiments may provide a multi-function optical imaging system that can provide secondary imaging options, including zoom-like capability, without moving parts and without interfering with the primary optical path components and functions.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1B:
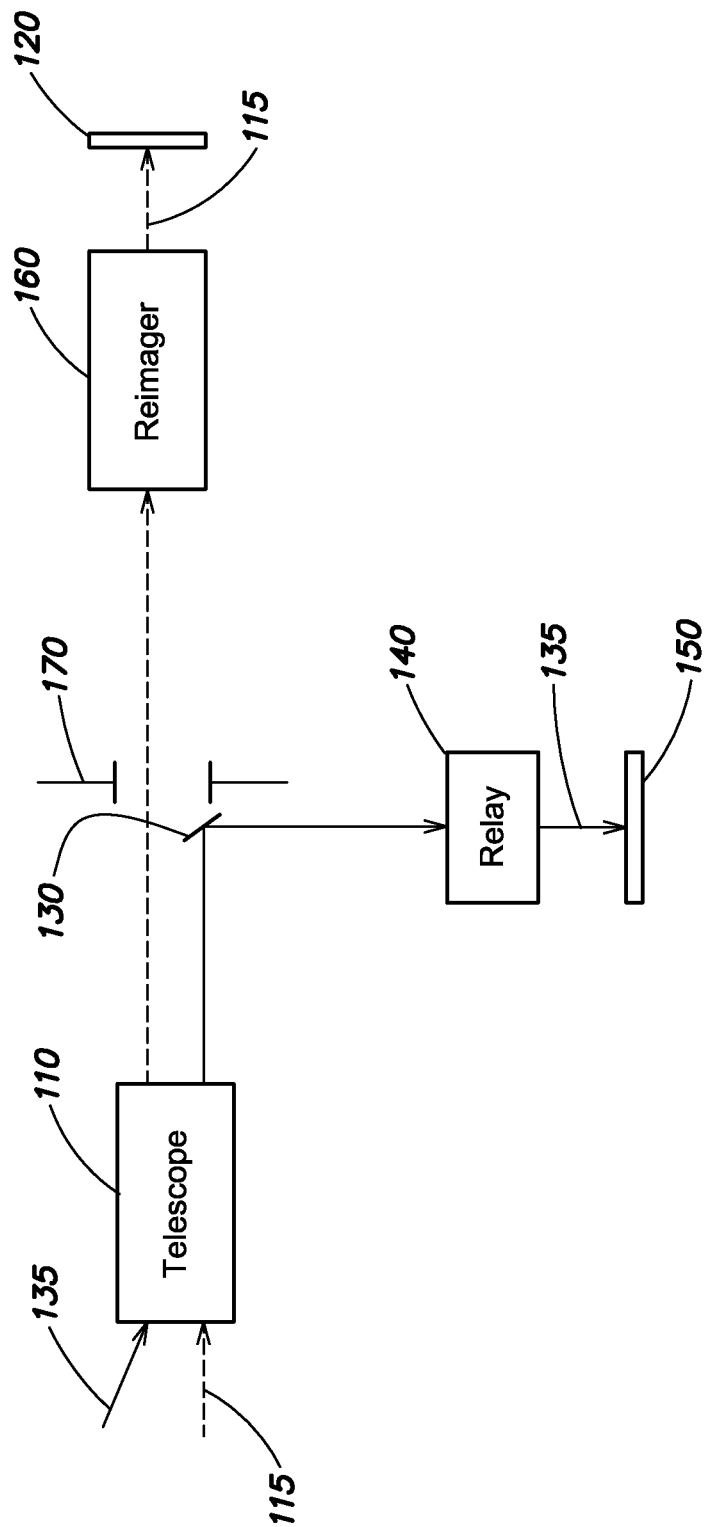
FIG. 1B is a block diagram of another example of an optical imaging system according to aspects of the invention.

Referring to FIG. 1A, there is illustrated a block diagram of one example of a dual field-of-view optical imaging system 100 according to certain embodiments. A telescope 110 directs incoming electromagnetic radiation 115 to a primary imaging detector 120. The telescope 110 may include one or more reflective and/or refractive optical elements configured to direct and focus the incoming electromagnetic radiation 115 onto the primary imaging detector 120. The primary imaging detector 120 may be any type of cooled or uncooled detector, such as a focal plane array, for example. In one embodiment, a small pick-off fold mirror 130 is used to direct a portion 135 of the electromagnetic radiation to relay optics 140 which, in turn, directs the portion 135 of the electromagnetic radiation onto a secondary detector 150. The relay optics 140 may include one or more reflective and/or refractive optical elements configured to direct and focus the electromagnetic radiation 135 onto the secondary detector 150. As shown in FIG. 1B, the imaging system 100 may also optionally include relay or reimager optics 160 in the optical path of the primary imaging detector 120. The reimager optics 160 may include one or more reflective and/or refractive optical elements configured to direct and focus the electromagnetic radiation 115 onto the primary imaging detector 120. The secondary detector 150 may be the same or a different type of detector as the primary imaging detector 120.

Using this approach, a second optical path may be created allowing for a different field of view and/or a different function to be viewed/performed simultaneously with and without disrupting the view and function of the primary imaging detector 120. For example, the secondary detector 150 may have a narrow field of view compared to the primary imaging detector 120, and the relay optics 140 may be configured to provide a certain magnification (e.g., 2× or 3×) such that a higher resolution image of a portion of the scene may be obtained using the secondary detector, as discussed in more detail below. In another example, the secondary detector 150 may be sensitive to electromagnetic radiation in a different spectral band than the primary imaging detector 120. For example, the primary imaging detector 120 may be an infrared detector, and the secondary detector 150 may be a visible detector. In other examples, the secondary detector may be a polarization sensitive detector, or a non imaging detection device such as a spectral dispersion sensor.

Figure 1C:
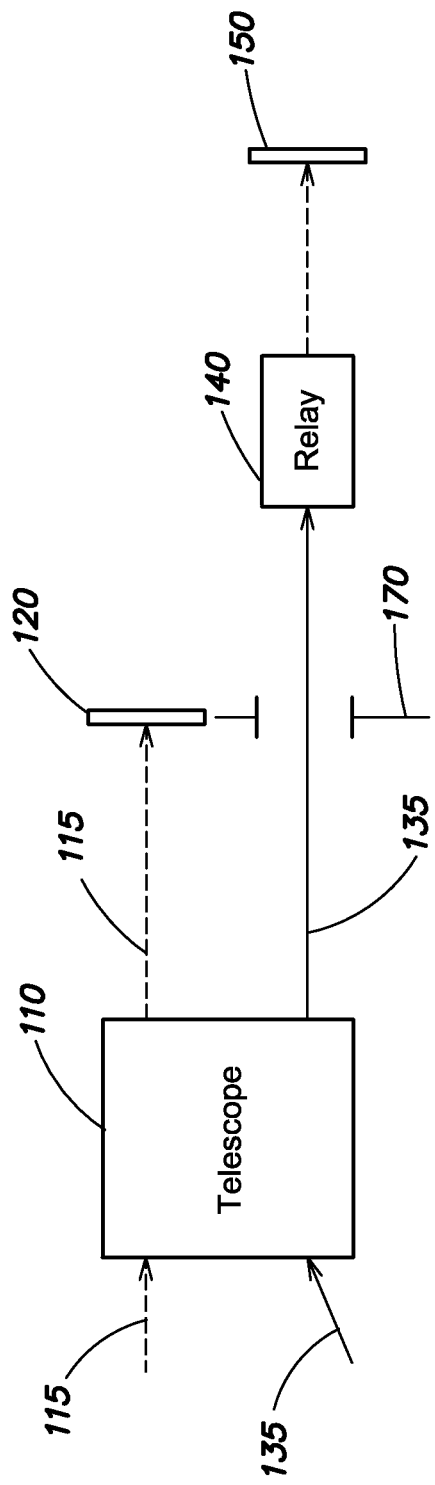
FIG. 1C is a block diagram of another example of an optical imaging system according to aspects of the invention.

In the example illustrated in FIG. 1A, the fold mirror 130 is located at a lower corner of the primary imaging detector 120. However, as discussed further below, in other examples the fold mirror 130 may be located in other positions. For example, referring to FIG. 1B, the fold mirror 130 may be located at the image plane 170, which may correspond to a field stop for the secondary detector optical path. In other examples, "pick off" of the portion 135 of the electromagnetic radiation may be accomplished without the use of the fold mirror 130, or using an optical element other than a fold mirror. For example, referring to FIG. 1C, in another configuration, an aperture may be located at the telescope image plane 170 and the optical components arranged such that the portion 135 of the electromagnetic radiation is allowed to pass through the aperture to the relay optics 140 and secondary detector 150. Additionally, more than one fold mirror may be used to create additional optical paths. For example, a second fold mirror may be positioned at the upper corner of the primary imaging detector to direct another portion of the electromagnetic radiation to a third detector. The third detector may have the same or a different field of view, and/or may operate in the same or different spectral band(s) as the primary or secondary detectors. As will be appreciated by those skilled in the art, given the benefit of this disclosure, numerous variations are possible and contemplated within the scope of this disclosure.

Figure 2:
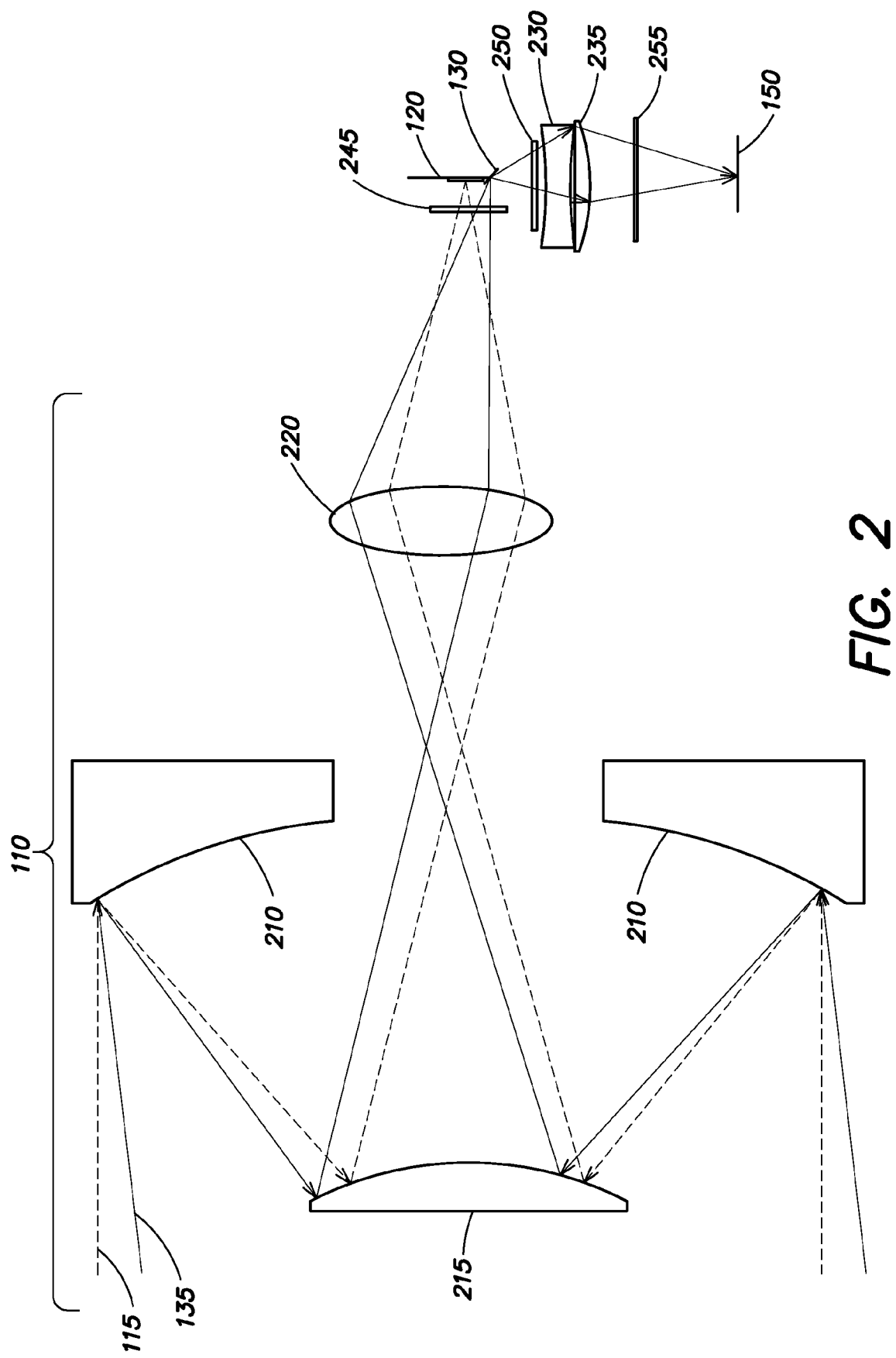
FIG. 2 is an optical layout illustrating one example of an optical layout of a dual field of view sensor system according to aspects of the invention.

FIG. 2 illustrates an example of an optical layout for one embodiment a dual field of view sensor system 200 according to certain aspects. It is to be appreciated that in FIG. 2 the ray trace is not intended to be drawn to scale, and that only the central field on each detector is shown. In this example, the telescope 110 includes two reflective mirrors, 210 and 215, and a lens 220. The incoming electromagnetic radiation 115 (including portion 135) is received by the primary mirror 210. The primary mirror 210 reflects the electromagnetic radiation 115 to the secondary mirror 215 which, in turn, reflects the electromagnetic radiation to the field lens 220. The field lens 220 directs and focuses the electromagnetic radiation 115 onto the primary imaging detector 120. It will be appreciated by those skilled in the art, given the benefit of this disclosure, that the telescope 110 is not limited to the catadioptric arrangement illustrated in FIG. 2, and many other configurations (reflective and/or refractive) may be implemented. For example, the telescope 110 may include three- or four-mirror anastigmat arrangements, refractive, catadioptic, off-axis obscured or unobscured telescope designs, etc.

As discussed above, the fold mirror 130 positioned proximate the primary imaging detector directs a portion 135 of the electromagnetic radiation via the relay optics 140 to the secondary detector 150. In the illustrated example, the relay optics 140 is a two-element refractive system including a first lens 230 and a second lens 235. In one example, the lens surfaces are even aspheres. However, a variety of other configurations may be used for the relay optics 140, including, for example, refractive doublets, refractive triplets, tilted lens elements, reflective optical forms, asymmetric aspheres (reflective or refractive), etc.

As discussed above, in one embodiment, the primary imaging detector 120 is a relatively low resolution detector having a relatively wide field of view provided by the telescope 110. A wide field of view may be useful for acquiring targets at long range since a relatively large scene may be viewed at any given time. The secondary detector 150 may be a higher resolution detector having a relatively narrow field of view, which may allow for higher resolution imaging, for example, when a target has been acquired and is at closer range. Accordingly, in one example, the relay optics 140 may be configured as a magnification relay, for example providing 2× or some other value of magnification to the electromagnetic radiation 135, to obtain a high resolution image at the secondary detector 150.

According to one embodiment, the telescope 110 has a larger aberration-corrected field of view than necessary to cover the full field of view of the primary imaging detector 120. For example, referring to FIG. 3A, the primary imaging detector may have a first field 310, and an enlarged field of view 320 of the telescope 110 may leave a region of well-corrected field outside of the primary imaging detector 120. A small portion 330 of this larger field 320 (corresponding to the electromagnetic radiation 135) may be directed to the secondary detector 150 via the relay optics 140, as discussed above, to obtain a high resolution image. Since the secondary detector 150 need view only a small portion of the field, it may be a small-format detector, thereby avoiding the need for a second, expensive large-format focal plane array in the system. For example, the primary imaging detector 120 may be a $256^2$ pixel infrared imager, and the secondary detector may be a $64^2$ pixel infrared imager, or the pixel pitches may be different between the two detectors, resulting in differently sized detectors even if the pixel count is the same.

Figure 3A:
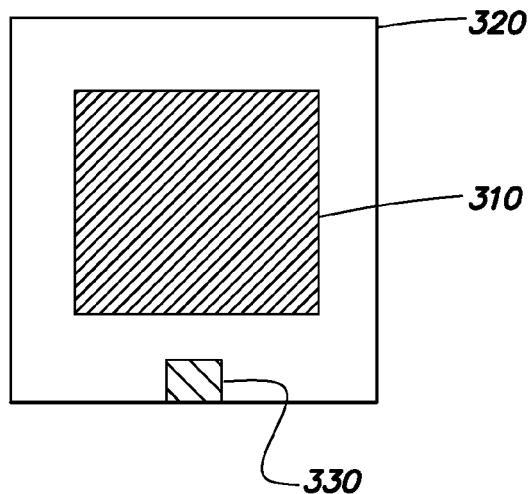
FIGS. 3A-F are block diagrams illustrating examples of fields associated with different detectors according to aspects of the invention.
Figure 3B:
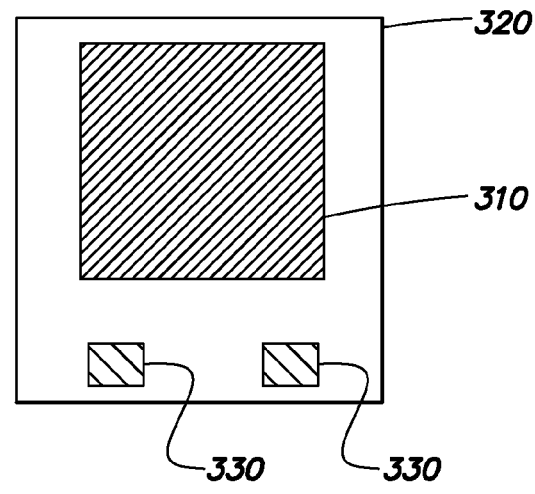
Figure 3C:
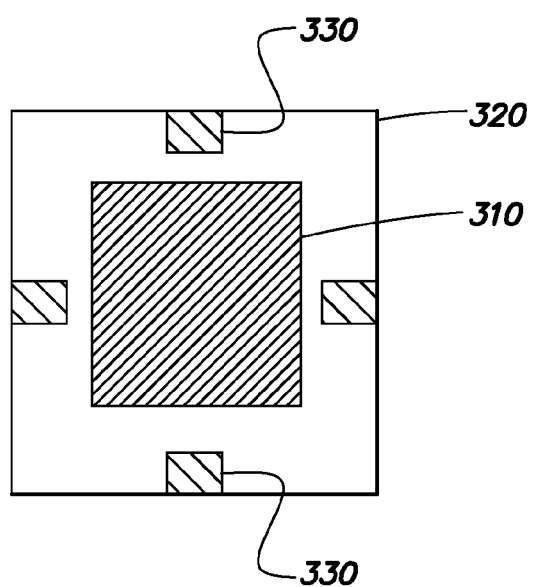
Figure 3D:
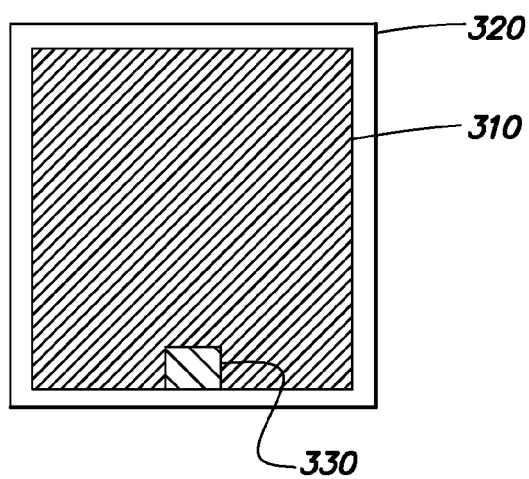
Figure 3E:
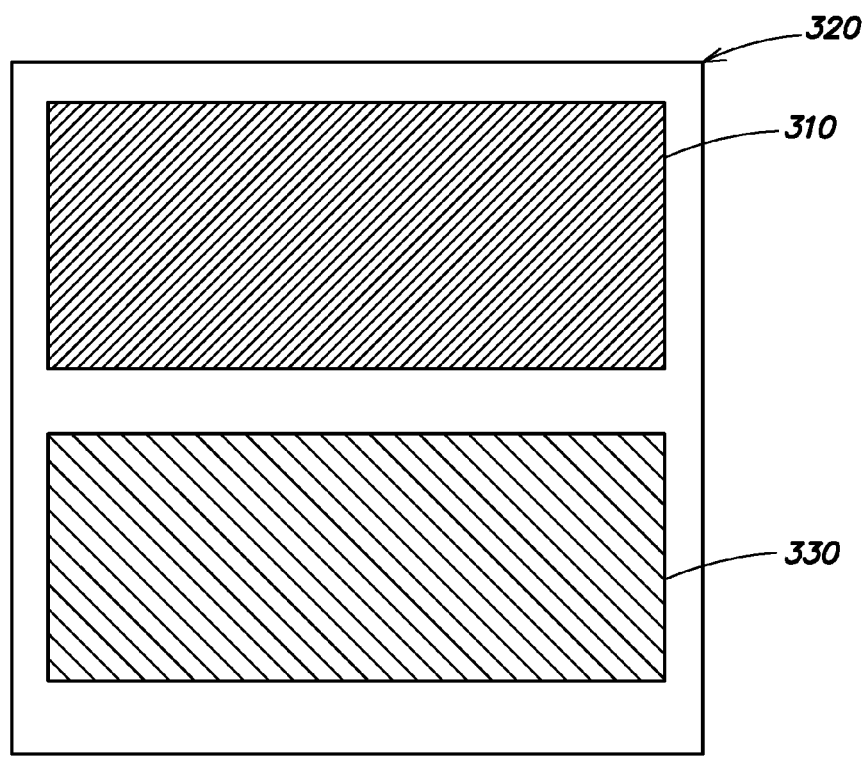
Figure 3F:
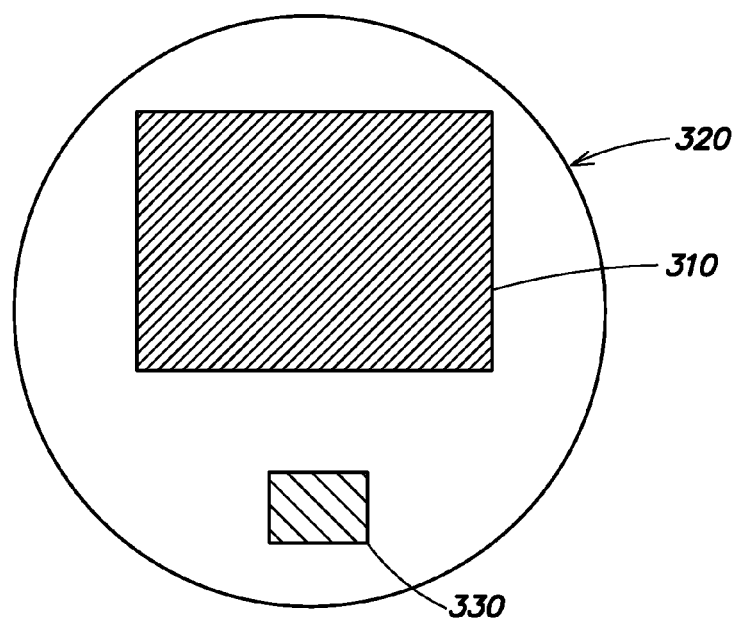

In the illustrated example, the fold mirror 130 is positioned such that the picked off field 330 is in the furthest lower location (i.e., below the primary imaging detector 120 in the orientation shown in FIG. 2). However, as discussed above, the fold mirror 130 may be alternatively placed in any of numerous other locations outside of the primary field detector. Alignment between the primary imaging detector 120 and the secondary detector is fixed. In one example the alignment may be fixed such that the smaller field of view secondary detector 150 sees a portion of the larger field of view 310 primary imaging detector 120, as illustrated in FIG. 3D, for example. In other examples, the alignment may be fixed such that smaller field of view secondary detector sees a portion of the field of view 320 of the telescope 110 adjacent to the larger field of view primary imaging detector 120, as illustrated in FIGS. 3A, 3E and 3F, for example. In certain examples, the field of view 320 of the telescope 110 may be circular, as shown in FIG. 3F. Furthermore, it is not necessary that the field of view 330 of the secondary detector 150 is smaller than the field of view 310 of the primary imaging detector 120; instead the optics may be arranged such that the field of view 310, 330 are similar in size, as shown in FIG. 3E, for example. As discussed above, according to certain embodiments, the optical imaging system 100 may include two or more secondary detectors 150, each arranged with a certain alignment to the primary imaging detector 150 and having its own field of view 330. FIGS. 3B and 3C illustrate two examples of field arrangements in which the system includes two or more secondary detectors 150. As will be appreciated by those skilled in the art, given the benefit of this disclosure, numerous variations and arrangements may be implemented, and the examples illustrated in FIGS. 3A-F are not intended to be limiting.

As discussed above, inclusion of the secondary detector and second optical path allows the imaging system 100 to view different fields of view and/or perform different functions. According to one embodiment, the two detectors 120, 150 view different locations in the scene captured by the telescope 110. Accordingly, the sensor system 200 may be scanned, or the platform on which the sensor system is mounted may be tilted or otherwise moved, in order to shift a target image from one detector to the other. This may be accomplished under the control of an operator or via a computer or other processing device. Thus, for example, a target may be acquired in the field of view 310 of the primary imaging detector 120, and subsequently, the controller/operator may scan or move the sensor system such that the target can be viewed in the field of view 330 of the secondary detector 150.

Figure 4:
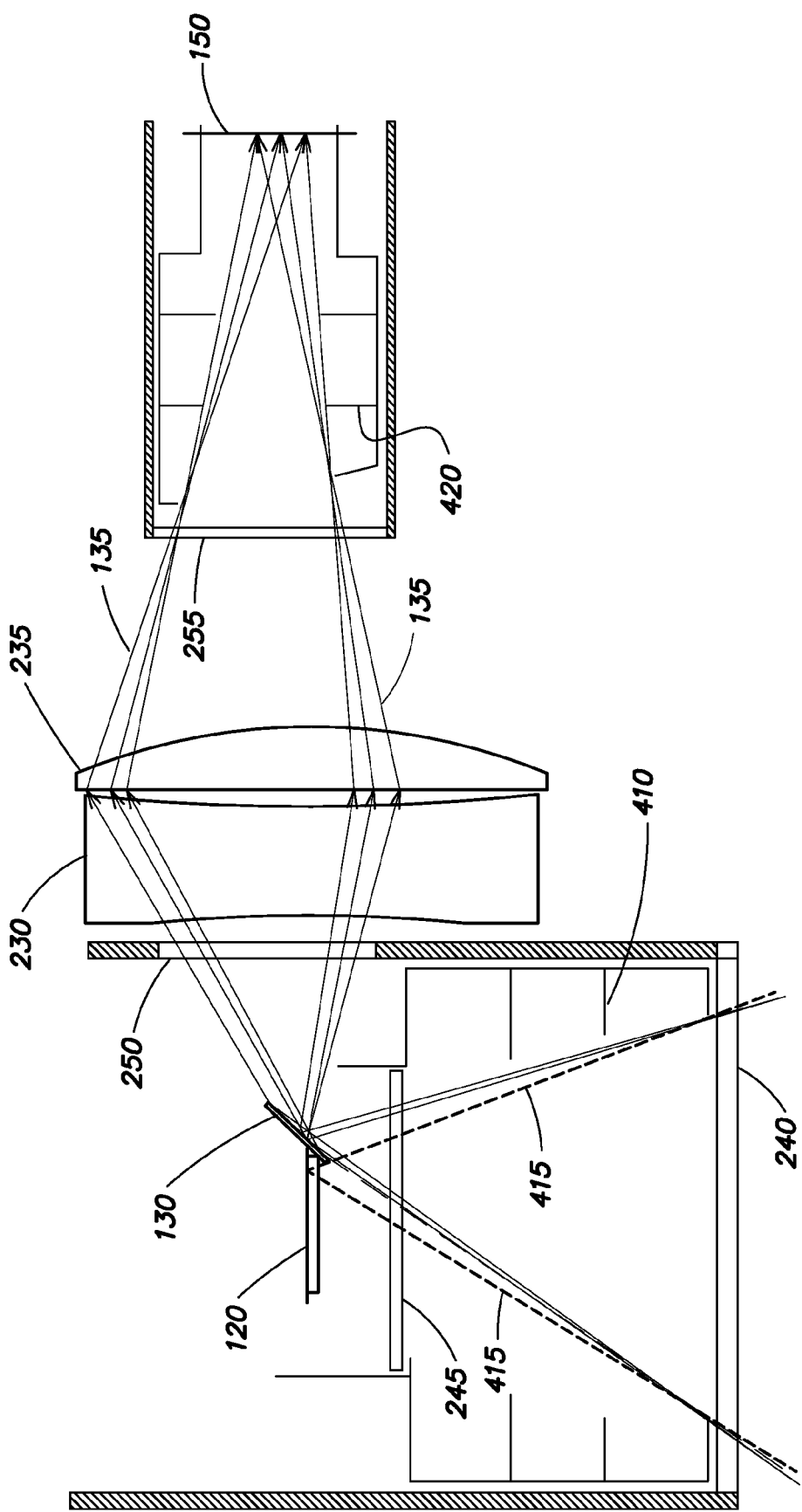
FIG. 4 is an optical layout illustrating another example of an optical layout of a portion of the sensor system of FIG. 2 according to aspects of the invention.

According to certain embodiments, particularly where the sensor system 200 is used to perform infrared imaging, either or both of the primary imaging detector 120 and the secondary detector 150 may be contained within a housing for cold shielding, for example, within an integrated dewar assembly. FIG. 4 illustrates a more detailed view of one example of a portion of the sensor system 200 in which both the primary imaging detector 120 and the secondary detector 150 are contained in dewar assemblies or other cold shielding housings configured to cryogenically cool the detectors. Referring to FIG. 4, in one example, the primary imaging detector 120 is located in a first dewar assembly 410. The incoming electromagnetic radiation 415, 135 enters the first dewar assembly 410 via an entrance window 240 and is focused via a cold filter 245 onto the first imaging detector 120 and the fold mirror 130, respectively. Dashed rays 415 represent the largest field on the primary optical path of the primary imaging detector 120. The electromagnetic radiation 135 is reflected from the fold mirror 130 and leaves the first dewar assembly 410 via an exit window 250. The electromagnetic radiation 135 is then focused by the relay optics (in the illustrated example lenses 230 and 235), via an entrance window 255 into a second dewar assembly 420 and onto the secondary detector 150. The three illustrated rays of electromagnetic radiation 135 represent different field points along the optical path of the secondary detector 150. The second dewar assembly 420 may be sized such that it is sufficiently long to extend to the exit pupil of the relay optics since this configuration may be preferable for reducing background noise across the field 330 of the secondary detector 150. In one example in which the secondary detector 150 is an infrared detector, the first lens 230 may be made of Zinc Selenide (ZnSe) and the second lens 235 may be made of Germanium (Ge); however, in other examples other materials may be used.

It will be appreciated by those skilled in the art, given the benefit of this disclosure, that is certain embodiments and depending on the application for which the imaging system is being used, the dewar assemblies 410 and/or 420 need not be in vacuum housings. Accordingly, in such embodiments, the entrance and exit windows 240, 250, and 255 may be removed. Furthermore, as discussed above, the use of uncooled detectors eliminates the need for cold shielding. Accordingly, in some embodiments the dewar assemblies 410 and/or 420 may be unnecessary and therefore not included. As also discussed above, in certain embodiments, the secondary detector 150 may be configured to operate in a different spectral band than the primary imaging detector 120. In such embodiments where the spectral band used by the secondary detector 150 does not overlap substantially with the spectral band used by the primary imaging detector 120, the filter 245 may be positioned out of the optical path of the secondary detector. For example, the filter 245 may be placed very close to or adjacent the primary imaging detector 120, such that the rays 135 do not need to pass through the filter 245 to reach the fold mirror 130.

The exemplary optical layouts illustrated in FIGS. 2 and 4 may provide a compact secondary optical path (including the relay optics 140, secondary detector 150, and optionally the second dewar assembly 420) which can be efficiently accommodated close to the primary sensor optics, as shown. In this example, the fold mirror 130 is tilted at approximately 45 degrees relative to the optical axis of the telescope 110 so as to provide a 90 degree fold in the optical path of the electromagnetic radiation 135, as illustrated in FIG. 4. However, in other examples, different tilt angles may be used to direct the electromagnetic radiation 135 in a desired direction. Additionally, in the illustrated examples, the primary detector 120 is centered on telescope 110, which may be preferable for minimum thermal background noise variation; however, other configurations may be used. For example, the field 310 of the primary detector 120 may be shifted off-center such as that shown in FIG. 3B, which may provide more clearance space for the fold mirror 130 with respect to the primary imaging detector 120, but may produce a higher and/or non-symmetric background along with potentially other performance compromises. In certain examples in which the second dewar assembly 420 is included, baffling may be used in the first dewar assembly 410 to limit reflected radiation from the secondary optics reaching the primary imaging detector 120.

Thus aspects and embodiments may provide a compact and efficient optical configuration for a dual field of view sensor system in which both fields of view may be simultaneously viewable. As discussed above, there are several applications in which it may be desirable to provide both a wide field of view and a very high resolution image of a portion of the field of view at certain times. Embodiments of the sensor system discussed above may provide both these features without significant modifications to the primary imaging optics and without significant added cost. Additionally, because the fold mirror may be fixed in position, the narrower field of view, high resolution image may be provided without the use of moving parts which are typically points of system failure. Since the secondary optics reimage a portion of the well-corrected telescope field of view 320, a well corrected image may be obtained.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. For example, where either or both of the first and second dewar assemblies 410, 420 are used, the relay optics 140 may incorporate entrance or exit windows, obviating the need for these as separate elements. Although in one example the relay optics 140 may provide a 2× magnification, in other examples the relay optics may provide other values of magnification, or may be configured as a reducer instead of a magnifier.

In one example the primary imaging detector 120 is a large format focal plane array, and the secondary detector 150 is a smaller format focal plane array which may be configured for operation in substantially the same spectral band as the primary imaging detector. For example, the detectors may be infrared detectors such that the sensor system 200 may provide thermal imaging. However, according to other variations, other detector formats and configurations may be used. For example, as discussed above, the secondary detector 150 may be a visible light detector or polarization sensitive detector, and may operate in a different spectral band than the primary imaging detector 120. In such examples where the secondary detector is not a cooled infrared detector, cold shielding may be unnecessary and accordingly the second dewar assembly 420 may be eliminated.

Figure 5A:
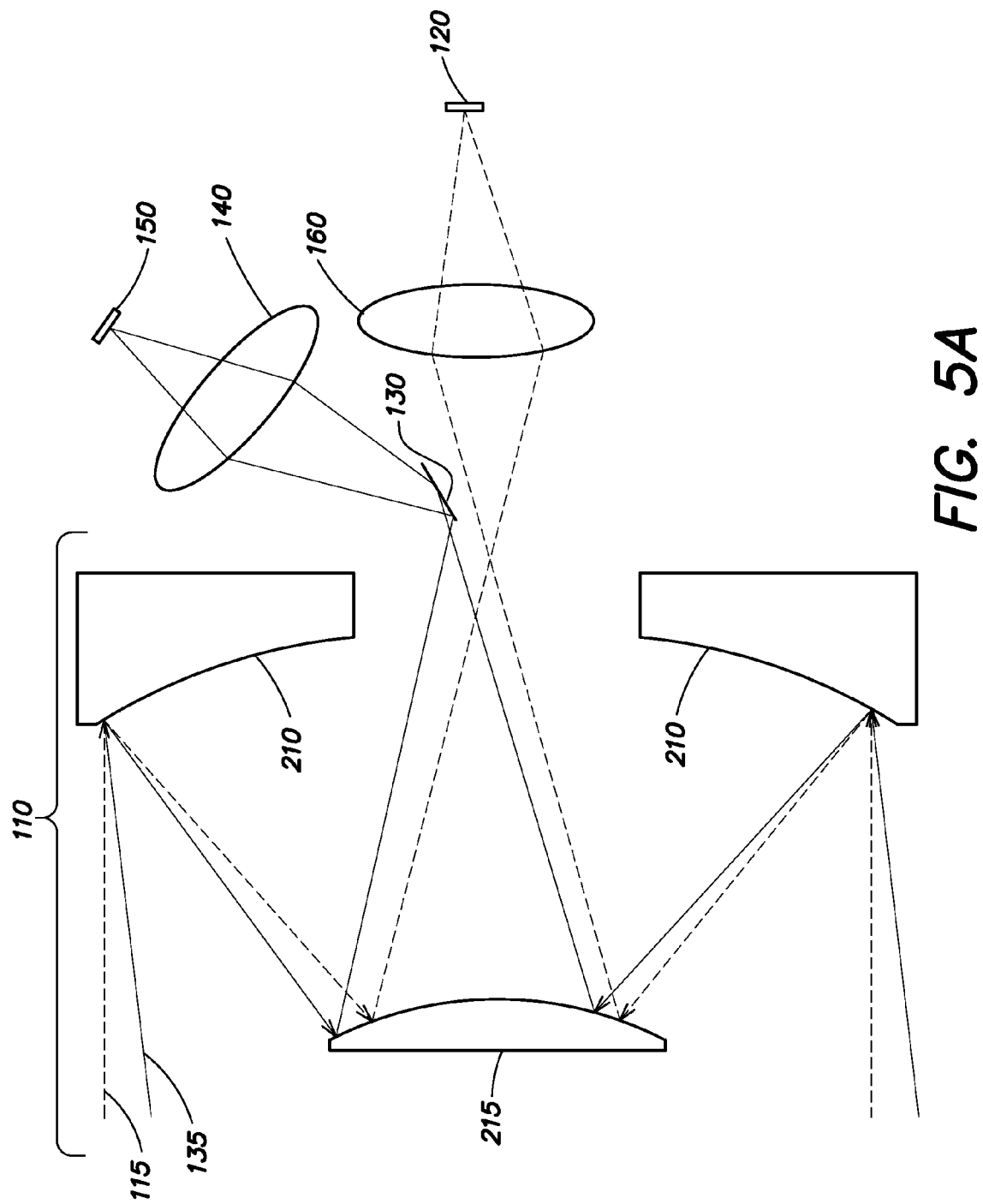
FIG. 5A is an optical layout illustrating another example of an optical layout of a dual field of view sensor system according to aspects of the invention.
Figure 5B:
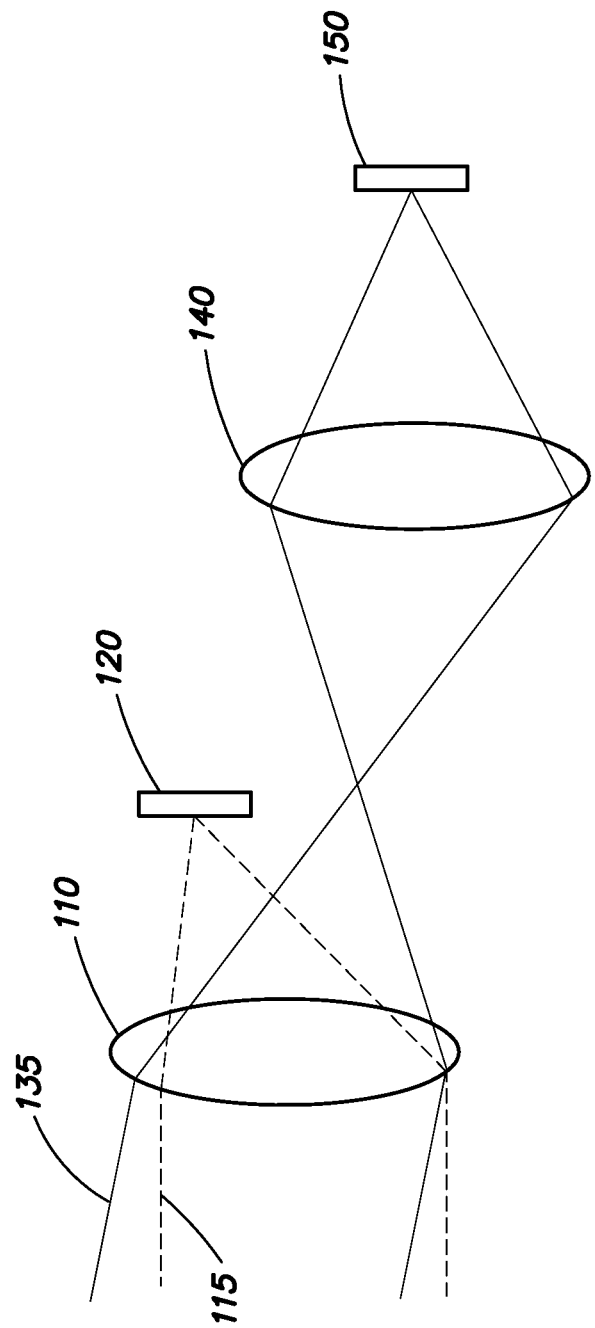
FIG. 5B is an optical layout illustrating another example of an optical layout of a dual field of view sensor system according to aspects of the invention.

As also discussed above, one or more additional secondary detectors and associated optics may be arrayed outside of the primary imaging detector 120. These detectors and their optical chains may include larger or narrower fields of view, different spectral bands than the primary sensor, polarization sensitive detectors, or even non imaging detection devices such as spectral dispersion sensors. In yet another variation, the optical path can be modified to provide an opening outside of the primary imaging detector 120 permitting passage of the portion 135 of the electromagnetic radiation through the opening to another optical device. In still another variation, the fold mirror(s) 130 may be placed on the field stop rather than next to the primary imaging detector 120, thereby permitting simpler or different optical designs. For example, referring to FIG. 5A, there is illustrated an example of another optical layout in which the fold mirror 130 is positioned near the field stop rather than adjacent the primary imaging detector 120, and directs the portion of the electromagnetic radiation 135 to the relay optics 140 and secondary detector 150. As discussed above, in other embodiments, the fold mirror may be unnecessary. For example, FIG. 5B illustrates an example of an optical layout in which the components are arranged such that the electromagnetic radiation 115 is directed by the telescope 110 to the primary imaging detector 120, whereas the portion of the electromagnetic radiation 135 bypasses the primary imaging detector and is directed by the relay optics 140 onto the secondary detector 150.

Those skilled in the art will further appreciate, given the benefit of this disclosure, that numerous other variations and configurations may be implemented. Accordingly, the foregoing description and drawings are by way of example only, and the scope of the invention should be determined from proper construction of the appended claims, and their equivalents.

What is claimed is:

1. An optical sensor system comprising:
    a telescope configured to receive and focus electromagnetic radiation onto an image plane along a primary optical axis;
    a primary imaging detector disposed on the image plane and having a first field of view;
    a fold mirror positioned on the image plane and fixedly tilted with respect to the primary optical axis, the fold mirror being configured to reflect a portion of the electromagnetic radiation off the primary optical axis along a secondary optical path non-parallel to the primary optical axis;
    a secondary detector having a second field of view different from the first field of view and disposed along the secondary optical path; and
    relay optics positioned in the secondary optical path between the fold mirror and the secondary detector and configured to direct and focus the portion of the electromagnetic radiation reflected from the fold mirror along the secondary optical path onto the secondary detector.

2. The optical sensor system of claim 1, wherein the fold mirror is positioned proximate an edge of the primary imaging detector.

3. The optical sensor system of claim 1, wherein the first field of view is a wide field of view and the second field of view is a narrow field of view.

4. The optical sensor system of claim 3, wherein the relay optics are configured to provide a predetermined magnification to the portion of the electromagnetic radiation.

5. The optical sensor system of claim 4, wherein the relay optics include a first lens and a second lens.

6. The optical sensor system of claim 1, further comprising:
    at least one additional secondary detector; and
    a corresponding at least one additional fold mirror configured to reflect another portion of the electromagnetic radiation towards the at least one additional secondary detector positioned off-axis with respect to the primary optical axis.

7. The optical sensor system of claim 1, wherein the primary imaging detector and the secondary detector are infrared detectors.

8. The optical sensor system of claim 7, further comprising:
    a first dewar assembly, the primary imaging detector being located within the first dewar assembly; and
    a second dewar assembly, the secondary detector being located within the second dewar assembly.

9. The optical sensor system of claim 1, wherein the primary imaging detector is an infrared detector configured to operate in a first spectral band, and wherein the secondary detector is one of a photosensitive detector configured to operate in a second spectral band different from the first spectral band, a polarization sensitive detector, and a spectral dispersion sensor.

10. An imaging method comprising:
    observing a first field of view by receiving electromagnetic radiation at a primary imaging detector along a primary optical axis of an optical sensor system, the primary imaging detector being located at an image plane;
    reflecting a portion of the electromagnetic radiation off the primary optical axis and along a secondary optical path non-parallel to the primary optical axis with a fixed fold mirror positioned at the image plane; and
    simultaneously observing a second field of view, different than the first field of view, by receiving the portion of the electromagnetic radiation reflected from the fold mirror at a secondary detector disposed along the secondary optical path.

11. The imaging method of claim 10, further comprising:
    reflecting another portion of the electromagnetic radiation off the primary optical axis with at least one additional fold mirror to provide additional reflected electromagnetic radiation; and
    receiving the additional reflected electromagnetic radiation with at least one additional secondary detector.

12. The imaging method of claim 10, further comprising:
    magnifying the portion of the electromagnetic radiation reflected from the fold mirror prior to receiving the portion of the electromagnetic radiation at the secondary detector.

13. The imaging method of claim 10, further comprising:
    cryogenically cooling at least one of the primary imaging detector and the secondary detector.

\* \* \* \* \*